Patented Oct. 24, 1950

2,527,374

UNITED STATES PATENT OFFICE 2,527,374

MERCAPTO ALCOHOL REACTION WITH POLYCARBOXYLIC ACIDS

Joseph C. Patrick, Morrisville, Pa., and Harry R. Ferguson, Trenton, N. J., assignors to Thiokol Corporation, Trenton, N. J., a corporation of Delaware No Drawing. Application November 7, 1944, Serial No. 562,398

11 Claims. (Cl. 260—77)

This invention relates to polymeric substances containing sulfur in chemical combination.

It is an object of the invention to provide new polymers and new polymeric processes or techniques, useful in the arts of waxes, lubricants, resins, and the like.

In accordance with the present invention, polybasic acids in general are reacted with mercapto alcohols that is, organic substances containing at least 1 hydroxyl group and 1 mercapto group.

Various examples of the genus or class designated as mercapto alcohols employed in accordance with the present invention are shown in the following table:

Table I $HOCH_2CH_2SH$
$HOCH_2.CHSH.CH_2OH$
$HO.CH_2.CH_2.O.CH_2.CH_2.SH$
$HO.CH_2.CH_2.S.CH_2.CH_2.SH$
$HO.CH_2.CH_2.SS.CH_2.CH_2.SH$ $HO.CH_2\text{—}\langle\text{benzene}\rangle\text{—}CH_2SH$ $HS.CH_2.CH_2.CH_2.CH_2SH$
$\quad\quad |$
$\quad\quad CH_2OH$ $CH_2OH.CHOH.CH_2SH$
$HO.CH_2CH=CH.CH_2.SH$
$HS.CH_2.CHOH.CH_2SH$ It is evident that the foregoing compounds are composed of carbon, hydrogen, sulfur and oxygen.

It will be seen from the above table that the mercapto alcohol may contain more than 1 hydroxyl group and more than 1 mercapto group. The specific structure of the compound may vary widely provided the compound contains at least 1 hydroxyl group and one mercapto group, this dual characteristic in respect of hydroxyl and mercapto groups being a common property which runs through all of said compounds. As far as the generic aspect of the invention is concerned, it is not the specific structure of the compound which is important but rather the functionality of the mercapto alsohol, that is, the presence of at least one hydroxyl and at least one mercapto group, each of which is attached to different carbon atoms.

By means of the reaction, polyesters are obtained containing sulfur in chemical combination. Where the functionality of the mercapto alcohol in terms of hydroxyl groups and mercapto groups is two and not more than two, and where the functionality of the polybasic acid in terms of acid groups, e. g., carboxyl groups, is also two and not more than two, linear polymers are obtained. Where the functionality of one or more of the reactants is three or more, cross linkage may be obtained. By reacting a mixture of mercapto alcohols having different specific structure with a single polybasic acid or mixture of polybasic acids, copolymeric polyesters may be obtained, the specific properties of which will vary depending upon the specific nature of the reactants, their relative proportion and their functionality. By varying the proportion of reactants having a functionality of three or more in respect of hydroxyl and mercapto groups, or acid groups, e. g., carboxyl groups, or both to the reactants having a functionality of two and not more than two, the extent of density of cross linkage may be varied.

For example, mercapto ethyl alcohol may be reacted with a dibasic acid, e. g., maleic acid, to produce a linear polymer. By substituting in this reaction a tribasic acid, considerable cross linkage will be obtained and the resulting polymer will be different. By using not only a tribasic acid but also a mercapto alcohol having a functionality of three or more, still more cross linkage will be obtained, as for example, by reacting 1,3 dihydroxy 2 mercapto n-propane with tricarballylic acid. By reacting a mixture of mercapto alcohols, e. g., a mixture containing a bifunctional mercapto alcohol and a trifunctional mercapto alcohol with a polybasic acid or mixture of such acids, a copolymeric polyester will be obtained, the density of cross linkage of which will vary depending upon the molar ratio of bifunctional reactant or reactants to the reactant having a functionality of three or more.

Further in accordance with the invention copolymeric polyesters are obtained by using, in addition to a mercapto alcohol or mixture of such alcohols, compounds where the bifunctionality or other multifunctionality is due wholly to mercapto groups or hydroxyl groups, and also be employing both kinds of compounds. For example, a mercapto alcohol may be mixed with a polyhydric alcohol, or one may in accordance with the invention employ a mixture containing a mercapto alcohol, a polyhydric alcohol and a polymercapto compound or a mixture containing a mercapto alcohol and a compound, the functionality of which is due wholly to mercapto groups. For example, any mercapto alcohol illustrated by any one of the compounds in Table I or mixtures thereof may be mixed with a polymercapto compound in general illustrated by any of the compounds set forth in Table III below or mixtures thereof, or with a polyhydric alcohol illustrated by any one of the compounds set forth in Table II below, or with both types of compounds illustrated by Tables II and III below, and the mixture may be reacted with a polybasic acid or mixture of such acids, to produce a polyester. By varying the specific structure of the compounds composing the reaction mixture or the functionality of said compounds or both, as well as the relative proportion of said components, changes in the properties of the resulting copolymeric polyesters may be made to produce a rather wide versatility of products useful as waxes, adhesives, lubricants, resins, etc.

Polyhydric alcohols in general may be employed illustrated by those shown in the following table:

Table II

Glycols in general exemplified by the following:

$CH_2OH.CH_2OH$, ethylene glycol
$CH_3.CHOH.CH_2OH$, propylene glycol
$HO.CH_2.CH_2.CH_2OH$, trimethylene glycol
$CH_3.CHOH.CHOH.CH_3$, butandiol 2,3
$CH_3.CHOH.CH_2.CH_2OH$, butandiol 1,3
$HO.CH_2.CH_2.CH_2.CH_2OH$, butandiol 1,4
$(CH_3)_2.C(OH)CH_2OH$, isobutylene glycol
$(CH_3)_2C(OH)C(OH)(CH_3)_2$, pinacol
$OH(CH_2)_nSS(CH_2)_nOH$ where $n$ may vary from 2 to 20 or more $$OH.CH_2.CH.CH_2.SS.CH_2.CH.CH_2.OH$$
$$\quad\quad\quad CH_3 \quad\quad\quad\quad CH_3$$

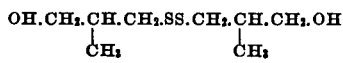

Polyhydric alcohols containing three or more OH groups, in general exemplified by the following:

$CH_2OH.CHOH.CH_2OH$, glycerine
$CH_3.CHOH.CHOH.CH_2OH$, butantriol 1,2,3

The erythritols, having the empirical formula $$CH_2OH.CHOH.CHOH.CH_2OH$$

$C(CH_2OH)_4$, pentaerythritol

The penta and hexahydric alcohols including

Arabitol    Sorbitol
Xylitol     Dulcitol
Mannitol

As above stated, the invention employs for copolymeric purposes polymercapto compounds in general, that is, compounds having two or more mercapto groups, particularly where the functionality of said compounds is due wholly to mercapto groups, said compounds being illustrated by those shown in the following table.

Table III $HSC_2H_4SH$
$HSC_nH_{2n}SH$ where $n$ may vary from 2 to 20 or more

$C_nH_{2n-1}(SH)_3$ $$HSCH_2CH—CH—CH_2CH_2SH$$
$$\quad\quad\quad\quad CH_2$$
$$\quad\quad\quad\quad SH$$

$C_nH_{2n-2}(SH)_4$

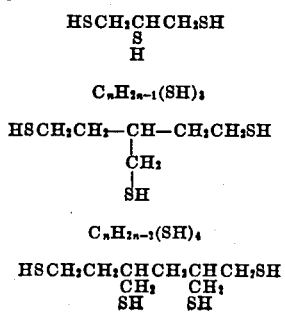

$HSC_2H_4OC_2H_4SH$ $(HSC_2H_4OC_2H_4S)_2$ $HS.(CH_2)_n.SS.(CH_2)_n.SH$ where $n$ may vary from 2 to 20 or more

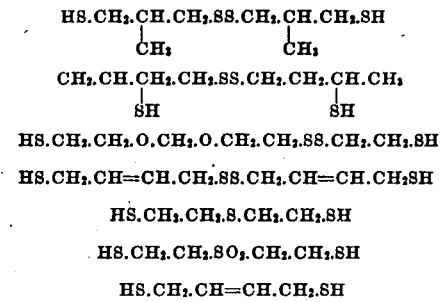

$HS.CH_2.CH_2.O.CH_2.O.CH_2.CH_2.SS.CH_2.CH_2.SH$ $HS.CH_2.CH=CH.CH_2.SS.CH_2.CH=CH.CH_2SH$ $HS.CH_2.CH_2.S.CH_2.CH_2.SH$ $HS.CH_2.CH_2.SO_2.CH_2.CH_2.SH$ $HS.CH_2.CH=CH.CH_2.SH$

Polybasic acids in general may be used, e. g., maleic, fumaric, succinic, malic, adipic, etc., tartaric, citric, phthalic, tricarballylic, etc., or the corresponding anhydrides. It is evident that the foregoing acids are composed of carbon, hydrogen and oxygen.

The reaction will take place without a catalyst, particularly at elevated temperatures with the elimination of water. However, to accelerate the reaction, a catalyst is preferably employed, the preferred catalyst being mineral or strong acids or acid salts or esters which under the conditions of the reaction supply acid, e. g., hydrochloric acid, sulfuric acid, phosphoric acid, chlorsulfonic acid, trichloracetic acid, etc., and various corresponding acid salts and esters which under the conditions of the reaction act to supply acid.

Moreover, readily hydrolyzable salts and compounds yielding acid may also be used, e. g., $AlCl_3$, $SO_2Cl_2$, $S_2Cl_2$, etc.

In addition to the use of polybasic acids in general and particularly organic polybasic acids, monobasic organic acids in general may be employed, particularly the higher monobasic fatty acids saturated and unsaturated, as for example, lauric, palmitic, stearic, oleic, linoleic, linolenic, etc.

The minimum molar ratio of polybasic or polybasic and monobasic acid or anhydride to the mercapto alcohols or mixtures thereof with polyhydric alcohols or polymercapto compounds or both is preferably regulated so that the total functionality of the said acid or acids in terms of the acid groups thereof, e. g., carboxyl groups, is at least about equal to the total functionality of the hydroxyl and mercapto groups in the compounds which react with said acid. For example in a mixture containing 1 mol of mercapto ethyl alcohol and 1 mol of glycerine, there are 5 functional groups, that is, 4 hydroxyl groups (3 of which are supplied by the glycerine) and 1 mercapto group. In reacting such a mixture with a dibasic acid, 5 carboxyl groups will be supplied by 2.5 mols of a dibasic acid. A greater or lesser proportion of acid may be employed. However, in accordance with the present invention, the functionality of the acid in terms of acid groups, e. g., carboxyl groups, is preferably balanced against the functionality of the mercapto and hydroxyl groups in the compound or compounds employed to react with the polybasic acid.

The principles of the invention will be defined in the claims and further illustrated by the following specific examples.

Example 1

The reaction is carried out between 1 mol of mercapto ethyl alcohol and 1 mol of maleic acid. As a catalyst, 1/100 of a mol of hydrochloric acid may be used. The reaction may be carried out in an esterification flask fitted with a trap and reflux condenser so that the water formed as a result of the condensation may be removed. When the initial reaction has subsided somewhat about 200 cc. of benzene may be added to aid in the elimination of water. The mixture is then heated to the boiling point of benzene and refluxed until the theoretical volume of water has collected in the trap. The benzene is then distilled off and heating on the water bath may be continued for say 5 to 6 hours, the resulting product remaining behind in the flask. When it is desired to carry out the reaction at a temperature higher than the boiling point of benzene, other azeotropic solvents having a higher boiling point may be employed, and in many cases, as for example, where the reaction bodies are relatively non-volatile, the use of the solvents may be omitted and the temperature of the reaction may be elevated to any desired level.

Example 2

Proceed as in Example 1 substituting 1 mol of 1,3 dimercapto 2 hydroxy n-propane for the mercapto ethyl alcohol of Example 1 and reacting this with 1.5 mols of maleic acid.

Example 3

Proceed as in Example 1 substituting a mixture of 1 mol of mercapto ethyl alcohol and 1 mol of ethylene glycol for the 1 mol of mercapto ethyl alcohol of Example 1 and using 2 mols of maleic acid.

Example 4

Proceed as in Example 1 substituting a mixture of 1 mol of mercapto ethyl alcohol and 1 mol of pentaerythritol for the 1 mol of mercapto ethyl alcohol of Example 1 and reacting the mixture with 3 mols of a dibasic acid, e. g., 3 mols of adipic acid or 2 mols of tribasic acid, e. g., 2 mols of tricarballylic acid.

Example 5

Proceed as in Example 1 substituting a mixture of 3 mols of 1,4 dimercapto 2 hydroxy methyl n-butane and 4 mols of propylene glycol for the 1 mol of mercapto ethyl alcohol of Example 1 and reacting this mixture with 8.5 mols of any dibasic acid, e. g., succinic or phthalic acid.

Example 6

Proceed as in Example 5 replacing the propylene glycol with the same number of mols of pentaerythritol and reacting the mixture with 12.5 mols of any dibasic acid or 8⅓ mols of any tribasic acid.

Example 7

Proceed as in Example 1 substituting for the 1 mol of mercapto ethyl alcohol used in that example a mixture of 1 mol of mercapto ethyl alcohol and 1 mol of dimercapto ethane and reacting this mixture with 1.35 of a mol of any tribasic, e. g., ⅔ of a mol of citric acid or tricarballylic acid.

Example 8

Proceed as in Example 7 substituting for the dimercapto ethane 1 mol of 1,2,3 trimercapto n-propane and reacting this mixture with 1.5 mols of any dibasic acid or mol of any tribasic acid.

Example 9

Proceed as in Example 1 substituting for the 1 mol of mercapto ethyl alcohol used in that example a mixture of 1 mol of mercapto ethyl alcohol, 1 mol of dimercapto ethane and 1 mol of ethylene glycol and reacting this mixture with 3 mols of any dibasic acid, as for example, 3 mols of maleic acid, or 2 mols of any tribasic acid.

It will be understood that in the above examples, mercapto alcohols in general may be substituted for the specific mercapto alcohols mentioned in the examples and more specifically that any of the mercapto alcohols set forth in Table I may be so substituted. The same statement applies to polyhydric alcohols and polymercapto bodies in general and more specifically the said polyhydric alcohols and polymercapto bodies set forth in Tables II and III herein. It will be understood that polybasic acids in general particularly the organic polybasic acids may be substituted for the specific polybasic acid or acids mentioned in said examples and that more specifically any of the specific polybasic acids herein mentioned may be so substituted, as well as mixtures thereof.

Instead of making the copolymers by reacting mixtures of the components entering into the composition of said copolymers, the copolymers may be made by first making the polymers themselves and then reacting said polymers to make copolymers. For example, mercapto ethyl alcohol may be reacted with maleic acid to produce a polymer; dimercapto ethane may be reacted with maleic acid to produce a polymer, and the two polymers may then be intimately mixed and reacted in the presence of a catalyst, if desired, to produce a copolymer. In this procedure, it is preferable to carry the separate polymers to a relatively low stage of polymerization before mixing those separate polymers and reacting to produce a copolymer. In these reactions, the same principles apply regarding the use or non-use of catalysts, which have been described in connection with the reaction of the monomeric compounds.

The invention is not limited to the reaction of polybasic acids with monomeric mercapto alcohols since the reaction is one of general application to organic compounds containing at least one hydroxyl group and at least one mercapto group in the polymeric as well as in the monomeric condition. By employing the splitting or cleavage technique disclosed in our copending applications Ser. No. 502,298, filed September 14, 1943, and Ser. No. 512,594, filed December 2, 1943 both of which are now abandoned, it is possible to prepare a wide variety of polymers the molecules of which contain both hydroxyl and mercapto groups and the present invention may be applied advantageously to such polymeric products by the reaction of polybasic acids therewith.

Examples of the application of the invention to such polymers having different molecular weights will be described. When the term "molecular weight" is applied to such polymeric compounds, it does not necessarily mean the molecular weight of a single chemical entity because in many cases the polymer will consist of a mixture of a large number of specifically different individual compounds, as for example, when a polysulfide polymer is subjected to the cleavage or splitting technique hereinafter described. However, the polymers thus obtained will have an average molecular weight.

There will be first be described the production of polymers having varying degrees of average molecular size followed by a description of the reaction thereof with polybasic acids.

*Example 10*

6 liters of 2-molar sodium disulfide solution are placed in a suitable flask equipped with means for mechanical agitation and a reflux condenser and to the polysulfide solution are added 50 grams of crystalline magnesium chloride and 20 grams of sodium hydroxide thereby leading to a gelatinous dispersion of magnesium hydroxide in the polysulfide solution. The agitator is kept running while the polysulfide is heated to a temperature of about 70° C. and 10 mols of BB' dichlor diethyl formal are added slowly to the polysulfide mixture at a rate such that about one hour is required for the complete addition of the organic dihalide. The temperature during this addition should be controlled in such a manner that it does not go above about 100° to 105° C. in order to prevent refluxing.

The stirred mixture is held at a temperature of about 105° C. for about an hour after all the organic dihalide is into the reaction after which the agitator is stopped and the latex like dispersion of the polymer is permitted to settle out from the liquid. After settling of the polymer is fairly complete the supernatant liquid is withdrawn by any suitable means as by siphoning and the dispersion is freed from soluble salts by repeated washing with warm water; this is most easily done by stirring the latex through the wash water and allowing it to settle. Then the water is withdrawn and replaced with fresh.

To produce a satisfactory high molecular weight it is desirable to treat the washed latex with about 2½ liters of a 2-molar solution of sodium sulfide similar to the one used in the preparation of the polymer. The suspension is then heated with this fresh charge of disulfide for about one hour at 100°–105° C., after which the polysulfide is washed out using the same technique as that described above for the initial washing of the latex. The latex like dispersion of the polymer resulting from the foregoing steps is, when coagulated, a tough, rubbery polymeric substance, the molecular weight of which is very high, certainly well over 50,000 and rough indications show it to have a molecular weight of approximately 100,000 to 120,000, and in some cases even higher.

It has been found that this high molecular weight polymer can be converted into a lower average molecular weight polymer having both mercapto groups and hydroxyl groups by splitting first with an alkaline hydrosulfide (or sulfide) and sulfite and then subjecting to acid hydrolysis. This procedure will be illustrated as follows:

To the washed latex produced as above described is added 0.09 gram of sodium hydrosulfide and 5 grams of sodium sulfite. The volume of the fluid dispersion is adjusted to about 3 liters and the dispersion is heated with constant agitation to a temperature of about 90° C. for 30 minutes. The agitator is stopped and the dispersed polymer is permitted to settle out as described above and is then washed free from soluble salts in the manner already described.

When this split polymer is coagulated, as for example by making slightly acid with acetic acid, and the coagulum dried by any suitable means the product is found to be a very stiff viscous liquid which is capable of flowing under its own weight if given sufficient time to do so. It is found by chemical test to consist principally of a polymer having chain molecules terminated by mercaptan or thiol groups. Determinations of molecular weight both cryoscopically and by end group titration show its molecular weight to be an average of about 16,000 although as in the case of nearly all synthetic polymers, this figure is found to be an average or statistical one since it can be domonstrated that fractions can be separated having somewhat higher as well as fractions having somewhat lower molecular weights than the mean.

To convert the above polymer having a molecular weight of about 16,000 into a lower polymer having hydroxyl as well as mercapto terminals, the washed latex containing said polymer resulting from the hydrosulfide split is brought to a pH of about 7 by treatment with acid, e. g., hydrochloric to neutralize the magnesium hydroxide dispersing agent and is then subjected to an acid hydrolysis, e. g., by adding about 0.25 gram of paratoluene sulfonic acid and heating to about 90° C. for about one hour. The resulting polymer is settled out and dried and has an average or statistical molecular weight of about 8000.

*Example 11*

Proceed exactly as in Example 10 to produce the high polymer having molecular weight over 50,000 but in the second part of the example involving the splitting treatment with sodium hydrosulfide and sulfite the proportions of the splitting agents are varied in such a manner that about 2 grams of sodium hydrosulfide and 10 grams of sodium sulfite are used. The volume is adjusted as described in Example 10 and the same heating technique is used. The coagulated and dried polymer has an average molecular weight of about 1000. To convert it into a polymer having hydroxyl as well as mercapto groups, the washed latex containing said polymer is brought to a pH of about 7.0 and subjected to an acid hydrolysis by treatment with about 1 gram of paratoluene sulfonic acid at about 90° C. for about 1 hour. The resulting polymer settles out readily and when dried has an average molecular weight of about 500.

To obtain polymers having average molecular weights different from those specifically described above, the proportions of reagents will be varied as taught by Examples 10 and 11.

Having shown details of the production of certain illustrative polymeric mercapto alcohol compounds in Examples 10 and 11, there will now be described specific illustrative instances of the reaction thereof with polybasic acids.

*Example 12*

Proceed as in Example 1 substituting for the 1 mol of mercapto ethyl alcohol in that example 500 grams of the polymer obtained according to Example 11.

*Example 13*

Proceed as in Example 1 using instead of mercapto ethyl alcohol the polymer obtained as in Example 10 having an average molecular weight of about 8000 and reacting this with slightly more than an equimolecular weight of maleic acid.

What is claimed is:

1. Process which comprises heating mercapto ethyl alcohol with a polycarboxylic acid composed of carbon, hydrogen and oxygen to make a polyester polymer, said acid being an organic monomeric acid wherein any oxygen atom which is not in a carboxyl group is part of an alcoholic hydroxyl group.

2. Process which comprises heating a mixture containing mercapto ethyl alcohol and pentaerythritol with a polycarboxylic acid composed of carbon, hydrogen and oxygen to make a polyester polymer, said acid being an organic monomeric acid wherein any oxygen atom which is not in a carboxyl group is part of an alcoholic hydroxyl group the proportion of polycarboxylic acid to the mercapto ethyl alcohol and pentaerythritol being sufficient to provide as many carboxyl groups as the sum of the hydroxyl and mercapto groups.

3. Process which comprises heating a mixture containing mercapto ethyl alcohol and 1,2,3 trimercapto n-propane with a polycarboxylic acid composed of carbon, hydrogen and oxygen to make a polyester polymer, said acid being an organic monomeric acid wherein any oxygen atom which is not in a carboxyl group is part of an alcoholic hydroxyl group the proportion of polycarboxylic acid to the mercapto ethyl alcohol and 1,2,3 trimercapto n-propane being sufficient to provide as many carboxyl groups as the sum of the hydroxyl and mercapto groups.

4. Process which comprises heating a mixture containing mercapto ethyl alcohol, dimercapto ethane and ethylene glycol with a polycarboxylic acid composed of carbon, hydrogen and oxygen to make a polyester polymer, said acid being an organic monomeric acid wherein any oxygen atom which is not in a carboxyl group is part of an alcoholic hydroxyl group the proportion of polycarboxylic acid to the mercapto ethyl alcohol, dimercapto ethane and ethylene glycol being sufficient to provide as many carboxyl groups as the sum of the hydroxyl and mercapto groups.

5. Process which comprises heating a mercapto alcohol composed of carbon, hydrogen, sulfur and oxygen with an organic monomeric polycarboxylic acid to make a polyester polymer, said mercapto alcohol being one wherein all effective reactive groups are sulfhydryl and hydroxyl groups, said acid being composed of carbon, hydrogen and oxygen and any oxygen atom of said acid that is not in a carboxyl group being part of an alcoholic hydroxyl group, the number of carboxyl groups in the polycarboxylic acid being at least equal to the number of hydroxyl and mercapto groups in the mercapto alcohol.

6. Process which comprises heating a mercapto alcohol composed of carbon, hydrogen, sulfur and oxygen and having only one hydroxyl group and one mercapto group with an organic monomeric polycarboxyl acid to make a polyester polymer, said mercapto alcohol being one wherein all effective reactive groups are sulfhydryl and hydroxyl groups, said acid being composed of carbon, hydrogen and oxygen and any oxygen atom of said acid that is not in a carboxyl group being part of an alcoholic hydroxyl group, the number of carboxyl groups in the polycarboxylic acid being at least equal to the number of hydroxyl and mercapto groups in the mercapto alcohol.

7. Process which comprises heating a mercapto alcohol composed of carbon, hydrogen, sulfur and oxygen and having at least two mercapto groups, with an organic monomeric polycarboxylic acid to make a polyester polymer, said mercapto alcohol being one wherein all effective reactive groups are sulfhydryl and hydroxyl groups, said acid being composed of carbon, hydrogen and oxygen and any oxygen atom of said acid that is not in a carboxyl group being part of an alcoholic hydroxyl group, the number of carboxyl groups in the polycarboxylic acid being at least equal to the number of hydroxyl and mercapto groups in the mercapto alcohol.

8. Process which comprises heating a mixture containing a mercapto alcohol composed of carbon, hydrogen, sulfur and oxygen and a polyhydric alcohol containing at least two hydroxyl groups, each of which is joined to an aliphatic carbon atom, said polyhydric alcohol containing no mercapto groups, with an organic monomeric polycarboxylic acid to make a polyester polymer, said mercapto alcohol being one wherein all effective reactive groups are sulfhydryl and hydroxyl groups, said acid being composed of carbon, hydrogen and oxygen and any oxygen atom of said acid that is not in a carboxyl group being part of an alcoholic hydroxyl group, said polyhydric alcohol being one wherein all effective reactive groups are hydroxyl groups, the number of carboxyl groups in the polycarboxylic acid being at least equal to the number of hydroxyl and mercapto groups in the mercapto alcohol and polyhydric alcohol.

9. Process which comprises heating a mixture containing a mercapto alcohol composed of carbon, hydrogen, sulfur and oxygen and a polymercapto compound containing at least two mercapto groups, each of said groups being joined to an aliphatic carbon atom, said polymercapto compound containing no hydroxyl groups, with an organic monomeric polycarboxylic acid to make a polyester polymer, said mercapto alcohol being one wherein all effective reactive groups are sulfhydryl and hydroxyl groups, said acid being composed of carbon, hydrogen and oxygen and any oxygen atom of said acid that is not in a carboxyl group being part of an alcoholic hydroxyl group, said polymercapto compound being one wherein all effective reactive groups are sulfhydryl groups, the number of carboxyl groups in the polycarboxylic acid being at least equal to the number of hydroxyl and mercapto groups in the mercapto alcohol and polymercapto compound.

10. Process which comprises heating a mixture containing a mercapto alcohol composed of carbon, hydrogen, sulfur and oxygen, a polymercapto compound containing at least two mercapto groups, each of said groups being joined to an aliphatic carbon atom, said compound containing no hydroxyl groups, and a polyhydric alcohol containing at least two hydroxyl groups, each of which is joined to an aliphatic carbon atom, said polyhydric alcohol containing no mercapto groups, with an organic monomeric polycarboxylic acid to make a polyester polymer, said mercapto alcohol being one wherein all effective reactive groups are sulfhydryl and hydroxyl groups, said acid being composed of carbon, hydrogen and oxygen and any oxygen atom of said acid that is not in a carboxyl group being part of an alcoholic hydroxyl group, said polymercapto compound being one wherein all effective reactive groups are sulfhydryl groups, said polyhydric alcohol being one wherein all effective reactive groups are hydroxyl groups, the number of carboxyl groups in the polycarboxylic acid being at least equal to the number of hydroxyl and mercapto groups in the mercapto alcohol, polymercapto body and polyhydric alcohol.

11. Process which comprises heating a mixture containing a mercapto alcohol composed of carbon, hydrogen, sulfur and oxygen, a polymercapto compound having only two mercapto groups, each of said groups being joined to an aliphatic carbon atom, said compound containing no hydroxyl groups, and a polyhydric alcohol having only two hydroxyl groups, each of which is joined to an aliphatic carbon atom, said compound containing no mercapto groups, with an organic monomeric polycarboxylic acid to make a polyester copolymer, said mercapto alcohol being one wherein all effective reactive groups are sulfhydryl and hydroxyl groups, said acid being composed of carbon, hydrogen and oxygen and any oxygen atom of said acid that is not in a carboxyl group being part of an alcoholic hydroxyl group, said polymercapto compound being one wherein all effective reactive groups are sulfhydryl groups, said polyhydric alcohol being one wherein all effective reactive groups are hydroxyl groups, the number of carboxyl groups in the polycarboxylic acid being at least equal to the number of mercapto and hydroxyl groups in the mercapto alcohol, polymercapto compound and polyhydric alcohol.

JOSEPH C. PATRICK.
HARRY R. FERGUSON.

REFERENCES CITED

The following references are of record in the file of this patent:

UNITED STATES PATENTS

| Number | Name | Date |
|---|---|---|
| 2,149,857 | Mikeska et al. | Mar. 7, 1939 |
| 2,343,808 | Schlack | Mar. 7, 1944 |